US012706290B2

(12) United States Patent
Gordon et al.

(10) Patent No.: US 12,706,290 B2
(45) Date of Patent: Aug. 11, 2026

(54) SYSTEM FOR DETERMINING THE CLEANLINESS OF MASS SPECTROMETER ION OPTICS

(71) Applicant: Micromass UK Limited, Wilmslow (GB)

(72) Inventors: David Gordon, Middlewich (GB); Nicola Lumley, Wilmslow (GB); Alastair Booth, Glossop (GB); Richard Moulds, Stockport (GB)

(73) Assignee: Micromass UK Limited, Wilmslow (GB)

( * ) Notice: Subject to any disclaimer, the term of this patent is extended or adjusted under 35 U.S.C. 154(b) by 751 days.

(21) Appl. No.: 18/042,956

(22) PCT Filed: Aug. 26, 2021

(86) PCT No.: PCT/GB2021/052222
§ 371 (c)(1),
(2) Date: Feb. 24, 2023

(87) PCT Pub. No.: WO2022/043695
PCT Pub. Date: Mar. 3, 2022

(65) Prior Publication Data

US 2023/0326733 A1 Oct. 12, 2023

(30) Foreign Application Priority Data

Aug. 26, 2020 (GB) ..................................... 2013325

(51) Int. Cl.
*H01J 49/06* (2006.01)
*H01J 49/00* (2006.01)

(52) U.S. Cl.
CPC .......... *H01J 49/06* (2013.01); *H01J 49/0036* (2013.01)

(58) Field of Classification Search
CPC ..... H01J 49/06; H01J 49/0036; H01J 49/0027
(Continued)

(56) References Cited

U.S. PATENT DOCUMENTS

2014/0264007 A1* 9/2014 Remes ................ H01J 49/0031 250/288
2015/0108341 A1 4/2015 Shishika et al.
2016/0118234 A1 4/2016 Covey et al.

FOREIGN PATENT DOCUMENTS

CN 105190831 A 12/2015
WO 2019146078 A1 8/2019
(Continued)

OTHER PUBLICATIONS

Search Report for United Kingdom Patent Application No. GB2013325.2, mailed Jun. 3, 2021.
(Continued)

*Primary Examiner* — Michael Maskell
(74) *Attorney, Agent, or Firm* — Goodwin Procter LLP

(57) ABSTRACT

A mass spectrometer is disclosed comprising: an ion detector; ion optics for guiding ions to the ion detector; one or more voltage supply for supplying voltages to said ion optics; control circuitry for controlling the one or more voltage supply so as to switch the ion optics between operating in a first mode in which the ion optics are unable to transmit ions having a first mass to charge ratio or first polarity to the ion detector and a second mode in which the ion optics are able to transmit ions having said first mass to charge ratio or first polarity to the ion detector for a time period; and to repeatedly switch between the first and second modes a plurality of times; and a processor and circuitry configured to: (i) determine the intensity of an ion signal detected by the detector at a first time in each of the time periods that the ion optics are in the second mode; and (ii) determine the intensity of the ion signal detected by the
(Continued)

detector at a second, later time in each of the time periods that the ion optics are in the second mode.

13 Claims, 5 Drawing Sheets

(58) Field of Classification Search
USPC ........................................ 250/281, 282, 288
See application file for complete search history.

(56) References Cited

FOREIGN PATENT DOCUMENTS

| | | | |
|---|---|---|---|
| WO | 2019229954 | A1 | 12/2019 |
| WO | 2020044161 | A1 | 3/2020 |
| WO | 2020121256 | A1 | 6/2020 |

OTHER PUBLICATIONS

International Search Report and Written Opinion for International Patent Application No. PCT/GB2021/052222, mailed Dec. 7, 2021.
Combined Search and Examination Report for United Kingdom Patent Application No. GB2112238.7, mailed Mar. 1, 2022.

* cited by examiner

SYSTEM FOR DETERMINING THE CLEANLINESS OF MASS SPECTROMETER ION OPTICS

CROSS-REFERENCE TO RELATED APPLICATIONS

This application is a U.S. national phase filing claiming the benefit of and priority to International Patent Application No. PCT/GB2021/052222, filed Aug. 26, 2021, which claims priority from and the benefit of United Kingdom patent application No. 2013325.2 filed on Aug. 26, 2020. The entire contents of these applications are incorporated herein by reference.

FIELD OF THE INVENTION

The present invention relates generally to mass spectrometers and more specifically to a system and method for determining the cleanliness of ion optics within the mass spectrometer.

BACKGROUND

Ion guiding devices are used in various types of mass spectrometers in order to transport ions along a given path. For example, one or more ion guiding device may be arranged so as to guide ions from one region of the spectrometer into another region that is maintained at a different pressure. The two regions that are maintained at different pressures may be separated by a differential pressure aperture. An ion guiding device may be arranged on one side of the aperture to guide ions towards and through the aperture, and an ion guiding device may be arranged on the other side of the aperture so as to receive and guide ions that have passed through the aperture. Alternatively, a single ion guiding device may be arranged within the aperture and may extend upstream and downstream thereof in order to guide ions through the aperture.

The ion guiding devices in the spectrometer, and possibly any differential apertures, may become dirty over time, e.g. due to ions and/or non-ionic species striking their surfaces. This contamination may affect the transit time of ions through the ion guiding devices (and/or apertures) and therefore the transit time of a given ion may vary depending on the level of contamination of the ion guiding devices (or apertures). Accordingly, the ion signal intensity profile derived from said given ion may vary, depending on the level of contamination. More specifically, the transit time of the ion may increase as the level of contamination increases and therefore the intensity of the ion signal in a spectrometer having a contaminated ion guiding device may be lower than the intensity of the ion signal in a spectrometer having a cleaner ion guiding device, at least for the initial part of the ion signal.

Users of the spectrometer typically run a System Suitability test before analysing a sample of interest in order to confirm that the system is fit for purpose before its use in analysing the sample. This includes analysing quality control samples and checking that the resulting ion signal that is detected has the expected sensitivity. However, the onset of cleanliness issues are difficult to detect because the detected ion signal for a given mass to charge ratio is averaged and compared to what is expected. If only the initial part of the ion signal is relatively low due to contamination, this may not bring the average signal down enough from what is expected in order to determine that there is a problem with contamination. The dirty ion guiding device may therefore not be detected by the System Suitability test or by analysing the quality control samples. As such, the user will then proceed to analyse their sample of interest, only for the system to fail mid-batch, causing a loss of time, solvent and sample. For example, the contamination is often only detected when analysing the final quality control at the end of the entire batch.

SUMMARY

From a first aspect the present invention provides a mass spectrometer comprising: an ion detector; ion optics for guiding ions to the ion detector; one or more voltage supply for supplying voltages to said ion optics; control circuitry for controlling the one or more voltage supply so as to switch the ion optics between operating in a first mode in which the ion optics are unable to transmit ions having a first mass to charge ratio or first polarity to the ion detector and a second mode in which the ion optics are able to transmit ions having said first mass to charge ratio or first polarity to the ion detector for a time period; and a processor and circuitry configured to: determine the intensity of the ion signal at a first time in said time period; determine the intensity of the ion signal at a second, later time in said time period; determine if there is a difference between the intensities at the first and second times; and produce a first output for indicating that the ion optics are dirty if said difference is above a threshold value, or the rate of change of intensity with time is below a threshold rate.

The processor and circuitry may be configured to produce a second, different output for indicating that the ion optics are clean if said difference is below a threshold value, or said rate of change of intensity with time is above a threshold rate.

The spectrometer may comprise or may be connected to a display screen such that the first output may cause the screen to display a notification that the ion optics require maintenance, such as cleaning. The second output may cause the screen to display a notification that the ion optics are clean, e.g. they do not require maintenance.

For the avoidance of doubt, each step of determining the intensity of the ion signal comprises determining the intensity of the ion detected by the ion detector.

Desirably, the ion optics are able to transmit only ions having said first mass to charge ratio or first polarity to the ion detector in the second mode.

The ion optics may comprise a mass filter and the control circuitry may be configured to control the mass filter so that it is unable to transmit ions having said first mass to charge ratio in the first mode and is able to transmit only ions having said first mass to charge ratio in the second mode.

The control circuitry may be configured to control the mass filter so as to be able to transmit only ions having said first mass to charge ratio in the second mode and to transmit only ions having a second, different mass to charge ratio in the first mode.

For example, the check of the cleanliness of the ion optics may be performed as part of the step of switching the mass filter between two different mass transmission windows, e.g. in an MRM experiment. For example, the spectrometer may be a triple quadrupole mass analyser in which the final quadrupole is the mass filter that operates in the first and second modes.

The ion optics may comprise one or more ion guide and/or differential pumping aperture upstream of the mass filter.

If the difference between the intensities at the first and second times is above the threshold value, or the rate of change of intensity with time is below a threshold rate, then the first output may indicate that the ion guide and/or differential pumping aperture is dirty. On the other hand, if the difference between the intensities at the first and second times is below the threshold value, or the rate of change of intensity with time is above a threshold rate, then the second output may indicate that the ion guide and/or differential pumping aperture are clean.

The ion optics may comprise a mass filter and an ion guide arranged upstream of the mass filter; and the control circuitry may be configured to vary a voltage applied to the mass filter so that it is able to transmit ions having different mass to charge ratios at different times, and to vary a voltage applied to the ion guide in synchronism with the mass filter so that at a given time the ion guide is optimised for transmitting ions having a mass to charge ratio that corresponds to the mass to charge ratio that the mass filter is set to transmit.

The ion guide may be an RF-only ion guide and the control circuitry may vary the RF voltage applied to the RF-only ion guide in synchronism with varying the voltage(s) applied to the mass filter.

The ion optics may comprise a mass filter and an ion gate or ion guide arranged upstream of the mass filter; wherein the control circuitry may be configured to: (i) control the mass filter so that it is able to transmit ions having said first mass to charge ratio in both the first and second modes; and (ii) control the ion gate or ion guide so as to prevent ions passing to the mass filter in the first mode and allow ions to pass to the mass filter in the second mode.

For example, when an ion gate is present, the control circuitry may cause one or more voltage to be supplied to the ion gate in the first mode so that ions are not transmitted by the ion gate to the mass filter and to cause one or more different voltage to be supplied to the ion gate in the second mode so that ions are transmitted by the ion gate to the mass filter. Similarly, when an ion guide is present, the control circuitry may control the voltages supplied to the ion guide so that ions are not transmitted by the ion guide to the mass filter in the first mode but are transmitted by the ion guide to the mass filter in the second mode. For example, RF voltages may be supplied to the ion guide in the second mode so as to radially confine the ions and guide them downstream to the mass filter, whereas the RF voltages may not be supplied in the first mode such that the ions are not radially confined and are not transmitted to the ion guide.

The spectrometer may comprise a source of said ions having the first mass to charge ratio arranged upstream of the ion optics.

The control circuitry may be configured to switch to and hold the ion optics in the second mode at a time such that, if the ion optics are clean, said ions having the first mass to charge ratio will arrive at the mass filter over substantially the entirety of said time period that the ion optics are held in the second mode; whereas if the ion optics are not clean said ions having the first mass to charge ratio will arrive at the mass filter with a lower intensity over at least an initial part of said time period that the ion optics are held in the second mode The spectrometer may comprise a source of said ions having said first mass to charge ratio, wherein said source and ion optics are configured such that the ion current to the mass filter of ions having said first mass to charge ratio is substantially constant over the substantially entirety of said time period, if the ion optics are clean.

In contrast, if the ion optics are dirty, the ion current to the mass filter of ions having said first mass to charge ratio is not constant and may increase with time over said time period.

The spectrometer may comprise a separator for separating analyte molecules or ions upstream of the mass filter such that ions of different mass to charge ratio are supplied to the mass filter at different times.

According to the spectrometer described herein, the step of determining the intensity of the ion signal at said first time in said time period may consist of: a) determining the average intensity of the ion signal over a first segment of said time period, and the step of determining the intensity of the ion signal at said second, later time in said time period consists of determining the average intensity of the ion signal over a second, later segment of said time period; or b) determining the average intensity of the ion signal over a first segment that is at or towards the start of said time period, and the step of determining the intensity of the ion signal at said second, later time in said time period consists of determining the average intensity of the ion signal over the entire time period.

For the avoidance of doubt, the first segment that is located towards the start of said time period is a segment that is located (in its entirety) before the end of the time period, e.g. before half-way through the time period.

Alternatively, the step of determining the intensity of the ion signal at said first time in said time period may consist of determining the instantaneous intensity of the ion signal at that time (i.e. not an average), and the step of determining the intensity of the ion signal at said second, later time may consist of determining the instantaneous intensity of the ion signal at that time (i.e. not an average).

The first time in said time period may be a time that is spaced from the start of the time period.

The present invention also provides a method of mass spectrometry comprising: providing a mass spectrometer as described above; and determining the cleanliness of the ion optics by: switching the ion optics from the first mode to the second mode such that the ion optics are able to transmit ions having said first mass to charge ratio or first polarity to the ion detector for a time period; determining the intensity of the ion signal at a first time in said time period; determining the intensity of the ion signal at a second, later time in said time period; determining if there is a difference between the intensities at the first and second times; and producing a first output for indicating that the ion optics are dirty if said difference is above a threshold value, or if the rate of change of intensity with time is below a threshold rate.

A second aspect of the present invention provides a mass spectrometer comprising: an ion detector; ion optics for guiding ions to the ion detector; one or more voltage supply for supplying voltages to said ion optics; control circuitry for controlling the one or more voltage supply so as to switch the ion optics between operating in a first mode in which the ion optics are unable to transmit ions having a first mass to charge ratio or first polarity to the ion detector and a second mode in which the ion optics are able to transmit ions having said first mass to charge ratio or first polarity to the ion detector for a time period; and to repeatedly switch between the first and second modes a plurality of times; and a processor and circuitry configured to: (i) determine the intensity of an ion signal detected by the detector at a first time in each of the time periods that the ion optics are in the second mode; and (ii) determine the intensity of the ion signal detected by the detector at a second, later time in each of the time periods that the ion optics are in the second mode.

The processor and circuitry may be configured to: determine how the intensities obtained in step (i) vary as a function of time; determine how the intensities obtained in step (ii) vary as a function of time; determine if the intensities obtained in step (i) vary with time in a different manner to the intensities obtained in step (ii); and in response to determining that the intensities vary with time in said different manner, produce a first output.

The first output may be indicative of an undesirable condition in the spectrometer, such as the ion optics being dirty.

The control circuitry may be configured to control the one or more voltage supply to repeatedly switch the ion optics between operating in the first and second modes a plurality of times during a single experimental run.

For example, the control circuitry may be configured to switch the ion optics between the first and second modes ≥2, ≥3, ≥4, ≥5, ≥6, ≥7, ≥8, ≥9, ≥10, ≥15, ≥20, ≥25, or ≥30 times, e.g. whilst a source of analyte is continually supplying analyte to an ion source of the spectrometer. The ion optics may be switched this many times over a time period selected from: ≤10 minutes; ≤9 minutes; ≤8 minutes; ≤7 minutes; ≤6 minutes; ≤5 minutes; ≤4 minutes; ≤3 minutes; ≤2 minutes; ≤1 minute; ≤30 seconds; ≤20 seconds; seconds; ≤5 seconds; or ≤1 second. For example, the ion optics may be switched from one mode to the other every few milliseconds or over longer time scales.

The processor and circuitry may be configured to determine that the intensities obtained in step (i) vary with time in the same manner as the intensities obtained in step (ii) and produce a second output. For example, the second output may be indicative of a desirable condition in the spectrometer, such as the ion optics being sufficiently clean The processor and circuitry may be configured such that: step (i) comprises determining that the ion signal varies with time as a peak; step (ii) comprises determining that the ion signal varies with time as a peak; step (iii) comprises determining that the area of the peak determined in step (i) is different from the area of the peak determined in step (ii); and step (iv) comprises producing said first output.

Step (iii) above may determine that the area of the peak determined in step (i) is lower than the area of the peak determined in step (ii). Alternatively, step (iii) above may determine that the area of the peak determined in step (ii) is lower than the area of the peak determined in step (i).

Alternatively, or additionally, the processor and circuitry may be configured such that: step (i) comprises determining that the ion signal varies with time as a peak; step (ii) comprises determining that the ion signal varies with time as a peak; step (iii) comprises determining that the time at which the peak determined in step (i) is detected is different from the time at which the peak determined in step (ii) is detected; and step (iv) comprises producing said first output. Step (iii) may determine that the time at which the peak determined in step (i) is detected is later than the time at which the peak determined in step (ii) is detected. The time at which a peak is detected may be determined from the time of the centre of the peak (e.g. the centre of the FWHM), or alternatively from the start or end time of the peak.

The processor and circuitry may be configured such that: step (i) comprises determining a gradient of the ion signal at a first time in the intensity profile; step (ii) comprises determining a gradient of the ion signal at a time in the intensity profile corresponding to said first time; step (iii) comprises determining that the gradient determined in step (i) is lower than the gradient determined in step (ii); and step (iv) comprises producing said first output.

The processor and circuitry may be manually prompted to perform steps (i)-(iv). Alternatively, the processor and circuitry may be configured to perform steps (i)-(iv) automatically.

The spectrometer may comprise or may be connected to a display screen such that the first output may cause the screen to display a notification that the ion optics require maintenance, such as cleaning. The second output may cause the screen to display a notification that the ion optics are clean, e.g. they do not require maintenance.

Desirably, the ion optics are able to transmit only ions having said first mass to charge ratio or first polarity to the ion detector in the second mode.

The ion optics may comprise a mass filter and the control circuitry may be configured to control the mass filter so that it is unable to transmit ions having said first mass to charge ratio in the first mode and is able to transmit only ions having said first mass to charge ratio in the second mode.

The control circuitry may be configured to control the mass filter so as to be able to transmit only ions having said first mass to charge ratio in the second mode and to transmit only ions having a second, different mass to charge ratio in the first mode.

For example, the check of the cleanliness of the ion optics may be performed as part of the step of switching the mass filter between two different mass transmission windows, e.g. in an MRM experiment. For example, the spectrometer may be a triple quadrupole mass analyser in which the final quadrupole is the mass filter that operates in the first and second modes.

The ion optics may comprise one or more ion guide and/or differential pumping aperture upstream of the mass filter. The first output may indicate that the ion guide and/or differential pumping aperture is dirty. On the other hand, the second output may indicate that the ion guide and/or differential pumping aperture are clean.

Although embodiments are contemplated in which a mass filter is switched between transmission and non-transmission modes, it is contemplated that the ion optics may comprise a mass filter and an ion gate or ion guide arranged upstream of the mass filter; wherein the control circuitry is configured to: (i) control the mass filter so that it is able to transmit ions having said first mass to charge ratio in both the first and second modes; and (ii) control the ion gate or ion guide so as to prevent ions passing to the mass filter in the first mode and allow ions to pass to the mass filter in the second mode.

For example, when an ion gate is present, the control circuitry may cause one or more voltage to be supplied to the ion gate in the first mode so that ions are not transmitted by the ion gate to the mass filter and to cause one or more different voltage to be supplied to the ion gate in the second mode so that ions are transmitted by the ion gate to the mass filter. Similarly, when an ion guide is present, the control circuitry may control the voltages supplied to the ion guide so that ions are not transmitted by the ion guide to the mass filter in the first mode but are transmitted by the ion guide to the mass filter in the second mode. For example, RF voltages may be supplied to the ion guide in the second mode so as to radially confine the ions and guide them downstream to the mass filter, whereas the RF voltages may not be supplied in the first mode such that the ions are not radially confined and are not transmitted to the ion guide.

The spectrometer may comprise a source of said ions having the first mass to charge ratio arranged upstream of the ion optics.

In the embodiments in which the mass filter is switched between transmission and non-transmission modes (in the first and second modes), for example, the control circuitry maybe configured to switch and hold the ion optics in the second mode at a time such that, if the ion optics are clean, said ions having the first mass to charge ratio will arrive at the mass filter over the entirety of said time period that the ion optics are held in the second mode; whereas if the ion optics are not clean said ions having the first mass to charge ratio will arrive at the mass filter with a lower intensity over at least an initial part of said time period that the ion optics are held in the second mode The spectrometer may comprise a source of said ions having said first mass to charge ratio, wherein said source and ion optics are configured such that the ion current to the mass filter of ions having said first mass to charge ratio varies with time.

The spectrometer may comprise a separator for separating analyte molecules or ions upstream of the ion optics.

For example, the spectrometer disclosed herein may comprise a liquid or gas chromatography separator for separating analyte and supplying the analyte to an ion source. Additionally, or alternatively, an ion mobility or mass separator may be provided for separating ions upstream of said ion optics.

The separator may cause ions of different physico-chemical properties, such as mass to charge ratio, to arrive at the ion optics at different times.

Ions of each mass to charge ratio, such as said first mass to charge ratio, may arrive at the ion optics (e.g. at the mass filter) with an intensity that varies with time.

The step of determining the intensity of the ion signal at a first time in each of said time periods may consist of determining the average intensity of the ion signal over a first segment that time period, and the step of determining the intensity of the ion signal at a second, later time in each of the time periods may consist of determining the average intensity of the ion signal over a second, later segment of that time period.

Alternatively, the step of determining the intensity of the ion signal at a first time in each of said time periods may consist of determining the average intensity of the ion signal over a first segment that is at or towards the start of that time period, and the step of determining the intensity of the ion signal at said second, later time in each of said time periods consists of determining the average intensity of the ion signal over the entire time of that time period. For the avoidance of doubt, the first segment that is located towards the start of said time period is a segment that is located (in its entirety) before the end of the time period, e.g. before half-way through the time period.

Alternatively, the step of determining the intensity of the ion signal at said first time in each time period may consist of determining the instantaneous intensity of the ion signal at that time (i.e. not an average), and the step of determining the intensity of the ion signal at said second, later time may consist of determining the instantaneous intensity of the ion signal at that time (i.e. not an average).

The present invention may also provide a method of mass spectrometry comprising: providing a mass spectrometer as described above in relation to the second aspect of the invention. The method comprises repeatedly switching the ion optics between the first mode and the second mode a plurality of times; (i) determining the intensity of an ion signal detected by the detector at a first time in each of the time periods that the ion optics are in the second mode; and (ii) determining the intensity of the ion signal detected by the detector at a second, later time in each of the time periods that the ion optics are in the second mode The method may comprise: determining how the intensities obtained in step (i) vary as a function of time; determining how the intensities obtained in step (ii) vary as a function of time; determine if the intensities obtained in step (i) vary with time in a different manner to the intensities obtained in step (ii); and in response to determining that the intensities vary with time in said different manner, produce a first output.

From a third aspect the present invention also provides a mass spectrometer comprising: an ion detector; ion optics for guiding ions to the ion detector; and a processor and circuitry configured to: (i) control the ion optics so as to sequentially perform a plurality of cycles of operation during a single experimental run, wherein each cycle of operation comprises transmitting a first species of ion for a first dwell time, subsequently transmitting a second different species of ion for a second dwell time, and subsequently transmitting the first species of ion for a third dwell time; (ii) determine the intensity of an ion signal detected by the detector during the first dwell time in each of the plurality of the cycles; and (iii) determine the intensity of an ion signal detected by the detector during the third dwell time in each of the plurality of the cycles.

The third aspect of the invention may have features described in relation to the second aspect of the invention.

Each cycle of operation may further comprise transmitting the second species of ion for a fourth dwell time, wherein the fourth dwell time is between the second and third dwell times or after the third dwell time.

Each cycle of operation may comprise transmitting a third or further species of ion during at least one further dwell time.

The processor and circuitry may be configured to: determine how the intensities obtained in step (ii) vary as a function of time; determine how the intensities obtained in step (iii) vary as a function of time; determine if the intensities obtained in step (ii) vary with time in a different manner to the intensities obtained in step (iii); and in response to determining that the intensities vary with time in said different manner, produce a first output.

The first output may be indicative of an undesirable condition in the spectrometer, such as the ion optics being dirty.

The spectrometer may comprise a separator for separating either analyte molecules in an analytical sample or separating analyte ions from an analytical sample, wherein the processor and circuitry are configured to control the ion optics so as to sequentially perform said plurality of cycles of operation during a peak that elutes from the separator.

The separator may be a chromatographic separator such as a liquid or gas chromatography separator.

The present invention also provides a method of mass spectrometry comprising: providing a mass spectrometer as described above in relation to said third aspect; (i) performing a plurality of cycles of operation during a single experimental run, wherein each cycle of operation comprises transmitting a first species of ion for a first dwell time, subsequently transmitting a second different species of ion for a second dwell time, and subsequently transmitting the first species of ion for a third dwell time; (ii) determining the intensity of an ion signal detected by the detector during the first dwell time in each of the plurality of the cycles; and (iii)

determining the intensity of an ion signal detected by the detector during the third dwell time in each of the plurality of the cycles.

The method may comprise determining how the intensities obtained in step (ii) vary as a function of time; determining how the intensities obtained in step (iii) vary as a function of time; determining if the intensities obtained in step (ii) vary with time in a different manner to the intensities obtained in step (iii); and in response to determining that the intensities vary with time in said different manner, producing a first output.

BRIEF DESCRIPTION OF THE DRAWINGS

Various embodiments will now be described, by way of example only, and with reference to the accompanying drawings in which.

DETAILED DESCRIPTION

Figure 1:
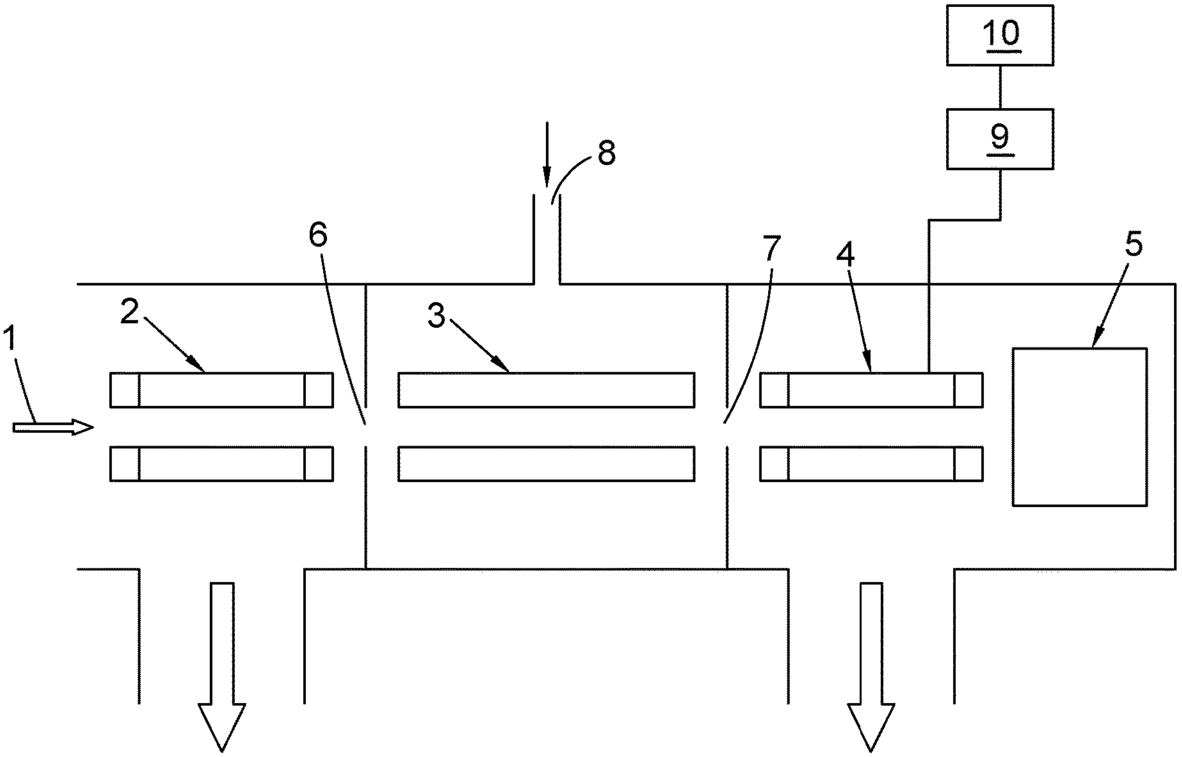
FIG. 1 shows a schematic of a triple quadrupole mass spectrometer according to a first embodiment of the invention.

FIG. 1 shows a triple quadrupole mass spectrometer comprising a first quadrupole rod set 2 arranged in a first chamber, a second quadrupole rod set 3 arranged in a second chamber, and a third quadrupole rod set 4 arranged in third chamber. An ion detector 5 is located downstream of the third quadrupole rod set 4. The first and second chambers are separated by a wall having a differential pumping aperture 6 therein, and the second and third chambers are separated by a wall having a differential pumping aperture 7 therein. The first and third chambers may be evacuated by one or more vacuum pumps, as illustrated by the arrows, whereas a gas may be provided into the second chamber through port 8. As such, the first and third chambers are maintained at relatively low pressures as compared to the second chamber, such that the second chamber may be used in fragmenting ions, as will be discussed further below.

In use, ions 1 from an ion source (not shown) are supplied to the first quadrupole rod set 2, which has RF and DC voltages applied thereto such that it operates as a mass filter. The quadrupole mass filter 2 may be arranged so as to selectively transmit only parent or precursor ions having a specific mass to charge ratio. These selected parent or precursor ions are therefore guided towards and through the differential pumping aperture 6 by the first quadrupole 2 such that these ions pass into the second quadrupole 3 arranged in the second chamber. As described above, the second chamber may be arranged at a relatively high pressure and the selected precursor ions may be accelerated into the second chamber such that at least some of them collide with the background gas therein and form fragment or product ions. Voltages are applied to the second quadrupole 3 such that it radially confines the resulting fragment or product ions (and optionally any unfragmented precursor ions). For example, quadrupole 3 may be an RF only ion guide. The second quadrupole 3 acts as an ion guide that guides these radially confined ions towards and through the differential pumping aperture 7 such that these ions pass into the third quadrupole 4 arranged in the third chamber. One or more voltage supply 9 supplies RF and DC voltages to the third quadrupole 4 such that it operates as a mass filter. Control circuitry 10 controls the one or more voltage supply 9 such that the voltages applied, at any given time, to the quadrupole mass filter 4 are such that only ions having a specific mass to charge ratio (or specific range of mass to charge ratios) are able to be guided by the quadrupole mass filter 4 to the ion detector 5, whereas ions having other mass to charge ratios that are present will be filtered out by the quadrupole mass filter 4. The voltages applied to the quadrupole mass filter 4 may be varied with time by the control circuitry 10, e.g. in a stepped manner, such that the quadrupole mass filter 4 is (only) able to transmit different specific mass to charge ratios (or different specific ranges of mass to charge ratios) to the ion detector 5 at different times.

The triple quadrupole mass spectrometer may be used to perform Selected Reaction Monitoring (SRM) or Multiple Reaction Monitoring (MRM) experiments wherein the quadrupole mass filter 2 is set so as to only transmit a specific precursor ion, i.e. to only transmit ions having a specific mass to charge ratio. This precursor ion is guided by quadrupole 2 into the second chamber, where it is fragmented or reacted so as to form fragment or product ions. The quadrupole 3 then guides these fragment or product ions into the third chamber and into the quadrupole mass filter 4. The quadrupole mass filter 4 may be set to monitor for one or more specific fragment or product ions of interest. This may be performed by the control circuitry 10 setting the voltages applied to the quadrupole mass filter 4 so that it is only able to transmit ions having a mass to charge ratio corresponding to one of the specific fragment or product ions of interest. If ions are then detected at the ion detector 5 it is determined that the specific fragment or product ion of interest is present and has been produced from the precursor ion that was transmitted by quadrupole mass filter 2. As mentioned above, the quadrupole mass filter 4 may be stepped with time such that the quadrupole mass filter 4 is (only) able transmit ions having different mass to charge ratios at different times. Accordingly, the voltages applied to the quadrupole mass filter 4 may be switched so that it is only able to transmit ions having a different mass to charge ratio that corresponds to another one of the specific fragment or product ions of interest. Then, if ions are then detected at the ion detector 5, it is determined that said another specific fragment or product ion of interest is present and has been produced from the precursor ion that was transmitted by quadrupole mass filter 2. The quadrupole mass filter 4 may be switched in this manner one or more further times in order to determine if one or more further fragment or product ion of interest has been produced.

The ion optics of the spectrometer may become dirty/contaminated over time, e.g. due to ions and/or non-ionic species striking their surfaces. For example, one or more of the quadrupole rod sets 2-4 that guide the ions, and possibly one or more of the differential apertures 6-7, may become dirty. This contamination may affect the transit time of ions through the ion optics and therefore the transit time of a given ion through the spectrometer may vary depending on the level of contamination of the ion optics. Accordingly, the ion signal intensity profile recorded for said given ion, or for an ion derived from said given ion, may vary in dependence on the level of contamination of the ion optics. More specifically, the transit time of an ion may increase as the level of contamination increases and therefore the intensity of the ion signal in a spectrometer having contaminated ion optics may be lower than the intensity of the ion signal in a spectrometer having a cleaner ion optics, at least for the initial part of the ion signal.

In a MRM (Multiple Reaction Monitoring) experiment being performed on an apparatus such as that in FIG. 1, for example, the mass to charge ratio that the quadrupole mass filter 4 is able to transmit may be changed with time by control circuitry 10 so that the mass filter 4 is able to transmit different fragment or product ions of interest at different times, as has been described above. In order to determine if these different fragment or product ions of interest are present, the quadrupole mass filter 4 must be operated so as to be able to transmit these different ions at times when these different ions are expected to arrive at the quadrupole mass filter 4. For example, in order to be able to detect the presence of a first fragment or product ion of interest, the voltages applied to the quadrupole mass filter 4 are held for a period of time (known as a dwell time) at values that enable ions having the mass to charge ratio of the first fragment or product ion of interest to be transmitted to the detector 5. Similarly, in order to be able to detect the presence of a second, different fragment or product ion of interest, the voltages applied to the quadrupole mass filter 4 are switched to different values that enable ions having the mass to charge ratio of the second fragment or product ion of interest to be transmitted to the detector 5. Again, the voltages are held at these values for a period of time (known as a dwell time). The voltages may be switched and held (for a dwell time) one or more further time to allow the detection of one or more further fragment or product ion of interest, respectively.

It will be appreciated that the voltages applied to the quadrupole mass filter 4 must be switched and held for dwell times during time periods in which the fragment or product ions of interest are expected to arrive at the quadrupole mass filter 4, otherwise they cannot be detected even if they are generated from the precursor ion. However, the times at which the ions arrive at the quadrupole mass filter 4 depend on the cleanliness of the upstream ion optics, e.g. depending on the cleanliness of the quadrupoles 2,3 or the differential pumping apertures 6,7. Therefore, for an experiment to be reliable it is important to determine when the ion optics have become excessively contaminated.

By way of example, the spectrometer may be set up such that when it has clean ion optics and a constant ion current, the ion signal detected will be constant over each dwell time of the quadrupole mass filter 4 (assuming that the respective fragment or product ion of interest is present). In other words, when the quadrupole mass filter 4 is switched to a new mass transmission window, the fragment or product ions of interest may be received and transmitted over the entire dwell time that the quadrupole mass filter 4 is held at this mass transmission window (assuming the ions are present). If the ion current is constant then the ion signal will be constant over the entire dwell time. In contrast, if the ion optics of the spectrometer are dirty/contaminated then the transit time of ions through those ion optics may be slower than if the ion optics were clean. As such, fragment or product ions of interest may arrive at the quadrupole mass filter 4 later than expected and so when the mass transmission window of quadrupole mass filter 4 is switched to a new mass to charge ratio, fragment or product ions having that mass to charge ratio may not yet have arrived at the quadrupole mass filter 4. As such, the intensity of the fragment or product ion signal arriving at the quadrupole mass filter 4, and hence ion detector 5, may increase during the dwell time, e.g. until the ion signal reaches a constant intensity if the ion current is constant.

Figure 2A:
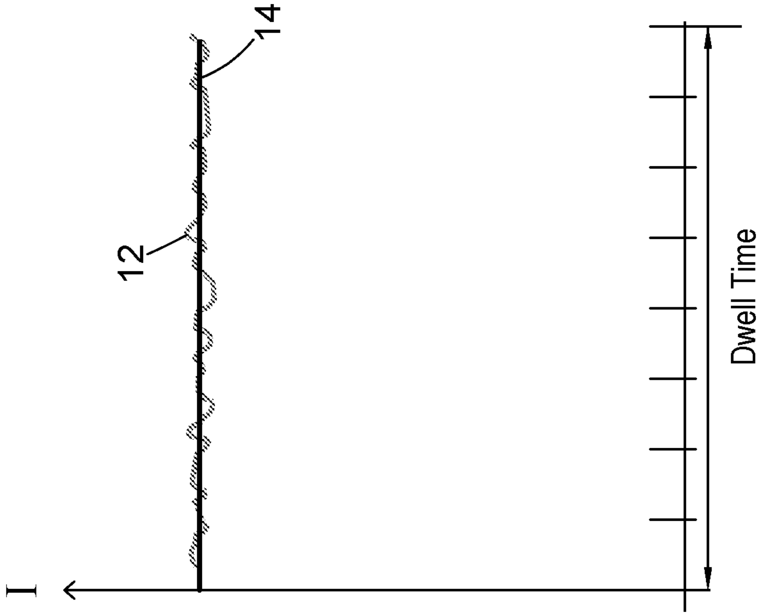
FIGS. 2A-2B show ion signals for a spectrometer with clean and dirty ion optics, respectively.
Figure 2B:
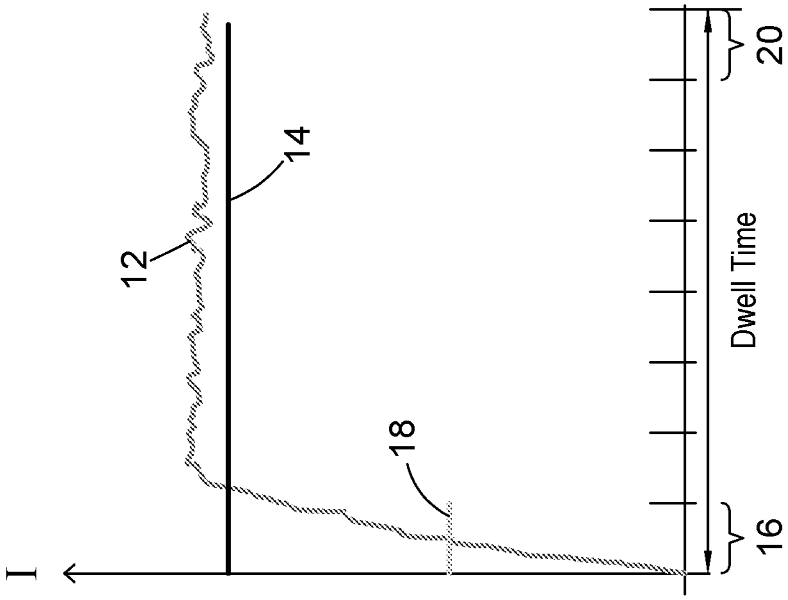

FIG. 2A shows the ion signal 12 detected for a fragment or product ion of interest that is transmitted by the quadrupole mass filter 4 during a dwell time, for a spectrometer with clean ion optics. FIG. 2B shows the ion signal 12 detected for the same fragment or product ion of interest that is transmitted by the quadrupole mass filter 4 during a dwell time, for a spectrometer with contaminated ion optics. As described above, when the ion optics are clean the ion signal 12 is substantially constant (for a constant ion current), whereas when the ion optics are contaminated the ion signal 12 rises and then becomes constant.

Conventionally, the ion signal recorded by the spectrometer for the ion of interest would be the average of the signal over the entire respective dwell time, which is shown by lines 14 in FIGS. 2A and 2B. It can be seen from FIGS. 2A and 2B that these average signals 14 are of very similar magnitude, even though the signal profile shown in FIG. 2A for the clean spectrometer is very different to the signal profile shown in FIG. 2B for the dirty spectrometer. As such, conventionally it has been difficult to determine from these average ion signals 14 if the ion optics of the spectrometer are dirty until the ion optics have become excessively dirty and problematic.

For example, a user of the spectrometer typically runs a System Suitability test before analysing a sample of interest in order to confirm that the system is fit for purpose before its use in analysing the samples of interest. This includes analysing quality control samples and checking that the resulting ion signal that is detected has the expected sensitivity. However, the onset of ion optic cleanliness issues are difficult to detect because for quadrupole instruments, e.g. in Multiple Reaction Monitoring or Selected Ion Monitoring (Selected Ion Recording) modes, the signal over the entire dwell time is averaged and therefore if the ion optics are only slightly dirty then this may not be detected by analysing the quality control sample. As such, the user will then proceed to analyse their batch of samples of interest, only for the system to fail mid-batch, thus causing a waste of time, solvent and samples. This failure is often only detected by the final quality control analysis at the end of the entire batch.

It has been demonstrated that for a constant ion current in a spectrometer having clean ion optics, the ion signal will be relatively constant over each entire dwell time. However, as the ion optics become contaminated, even if the ion current from the ion source is constant the ion signal at the start of the dwell time may differ significantly from the ion signal at the end of the dwell time.

Embodiments of the present invention seek to address this problem by monitoring if the ion signal 12 detected changes within a single dwell time. The ion signal corresponding to one location in, or segment of, the dwell time may be compared to the ion signal corresponding to another location in, or segment of, the same dwell time. Alternatively, the ion signal corresponding to one location in the dwell time may be compared to the average ion signal of at least part of the dwell time. Alternatively, the average ion signal corresponding to one segment of the dwell time may be compared to the average ion signal a differently sized segment of the dwell time or of the entire dwell time.

If the difference between these ion signals is below a threshold value then it may be determined that the ion optics are relatively clean, e.g. such that the spectrometer may be used to analyse samples of interest without prior maintenance/cleaning of the spectrometer. The spectrometer may be configured to produce an output for indicating this, e.g. to a display screen. On the other hand, if the difference between these ion signals is above a threshold value then it may be determined that the ion optics are relatively dirty, e.g. such that the spectrometer may not be used to analyse samples of interest without prior maintenance/cleaning of the spectrometer. The spectrometer may be configured to produce a different output for indicating this, e.g. to a display screen. By determining if the ion signal changes significantly within a dwell time, rather than using the conventional technique of comparing the average signal to an expected average value, the embodiments of the present invention enable the spectrometer to determine when its ion optics are dirty before the ion optics become highly dirty. This enables the user to know that the ion optics need to be cleaned before starting an experimental run and so prevents unplanned downtime, waste of solvent and sample. Embodiments of the invention therefore recognise that the process of switching the quadrupole mass filter to different masses can be used to determine the cleanliness of the ion optics.

For example, referring to FIGS. 2A-2B, the x-axis represents a single dwell time and the y-axis represents the intensity of the ion signal detected as a function of the dwell time. According to embodiments, the dwell time may be considered to be formed from multiple segments of dwell time, wherein the segments are represented as the regions between the vertical lines arranged on the x-axis. The average of the ion signal detected during one of these segments 16 may be determined, as represented by intensity line 18 in FIG. 2B. This intensity 18 may then be compared to the average of the ion signal detected during another of the segments (or an average intensity over the entire dwell time 14) in order to determine if the ion signal changes significantly during the dwell time. It will be apparent that this is not the case for the scenario of a spectrometer having clean ion optics as shown in FIG. 2A. However, as can be seen from FIG. 2B, the average ion signal 18 for the first segment of the dwell time is significantly different to the average ion signal of the last segment 20 of the dwell time (and to the average intensity over of the entire dwell time 14). The detection of this relatively large difference in average ion signals during a single dwell time indicates that the ion optics have become dirty.

Although FIG. 2B shows comparing the average ion signals for the first and last segments 16,20, it will be appreciated that the average ion signal for two different segments may be compared. Furthermore, although the dwell time is shown as being divided into eight dwell time segments in the illustrated embodiment, it is contemplated that each of the dwell time segments used in the comparison step may have other durations (i.e. not necessarily one eighth of the entire dwell time).

It is also contemplated that, rather than comparing average ion signals from different dwell time segments, the spectrometer may instead compare the instantaneous ion signal at one point in the dwell time with the instantaneous ion signal at another point in the dwell time (i.e. not averaged ion signals).

According to embodiments, the spectrometer analyses the ion signal intensity recorded at multiple times within the dwell time and determines the duration of time that it takes for the signal intensity to become constant. If this duration is below a threshold then the spectrometer may determine that the ion optics are clean, whereas if the duration is above a threshold then the spectrometer may determine that the ion optics are dirty/contaminated. The spectrometer may comprise electronic circuitry that then controls a user interface to indicate that the ions optics require maintenance/cleaning.

The embodiments described herein are particularly beneficial in experiments where ions having different physicochemical properties, such as different masses, polarities or mobilities are sequentially transmitted to the mass filter (e.g. during a multiple function MRM method). This is because when the ion optics are dirty, the ions may not have reached the mass filter by the time it is switched to a new mass transmission window. The dirty ion optics therefore typically cause an ion signal loss (relative a spectrometer having clean ion optics) that occurs over a time period primarily corresponding to the start of the new mass transmission window.

Embodiments are also contemplated in which the ion current supplied by the source of the ion of interest is not constant, but varies with time. For example, the spectrometer may comprise a chromatographic separator (e.g. a liquid or gas chromatography separator) or other separator for separating either the analyte molecules in the sample or separating analyte ions from the sample. In such embodiments, the ion signal detected over each dwell time may not be constant, even if the ion optics are clean, because the ions being received by the mass filter during the dwell time may be, or be derived from, ions that have eluted from the separator during the up-slope or down-slope of a peak eluting from the separator. However, embodiments of the invention are still able to determine from the detected ion signal whether or not the ion optics are dirty/contaminated. For example, this may be achieved by taking into account the detected ion signal intensity for both sides of the eluting peak.

According to embodiments having the separator, the quadrupole mass filter repeatedly performs a cycle of operation whilst the molecules or ions elute from the separator. Each cycle of operation comprises holding the voltages applied to the mass filter 4 at values that enable only ions having a first mass to charge ratio to be transmitted to the detector 5 for a first dwell time, and then switching and holding the voltages applied to the mass filter 4 at different values that enable ions having only a second, different mass to charge ratio to be transmitted to the detector 5 for a second dwell time. Although the quadrupole mass filter 4 has been described as being switched twice in each cycle, it may be switched in this manner one or more further times during each cycle. Alternatively, the spectrometer may be switched so that each cycle only comprises transmitting the first ion and transmitting no ions. The cycle may be performed multiple times during each peak of ions that elutes from the separator.

The data recorded by the spectrometer may be processed to determine how the ion signal intensities for one of the types of ions (e.g. the first or second ion) varies as a function of the elution time from the separator. This may be performed by determining the ion signal intensities from the cycles that correspond to said one of the types of ions and determining how these vary as a function of the elution time from the separator. The ion signal intensities for said one of the types of ions are determined from the ion signals detected during the dwell times at which the mass filter was operated so as to transmit said one of the types of ions.

The spectrometer may determine how the ion signal intensities for one of the types of ions (e.g. the first or second ion) varies as a function of the elution time from the separator, when the ion signal intensities are determined from the intensity at only the initial parts of the dwell times. The spectrometer may also determine how the ion signal intensities for the one of the types of ions varies as a function of the elution time from the separator, when the ion signal intensities are determined from the intensities at only a later part of the dwell times (or when each ion signal intensity is determined as the average intensity over each dwell time). This data can then be used to determine if the ion optics are clean or dirty, as will be described below in relation to FIG. 3.

Figure 3:
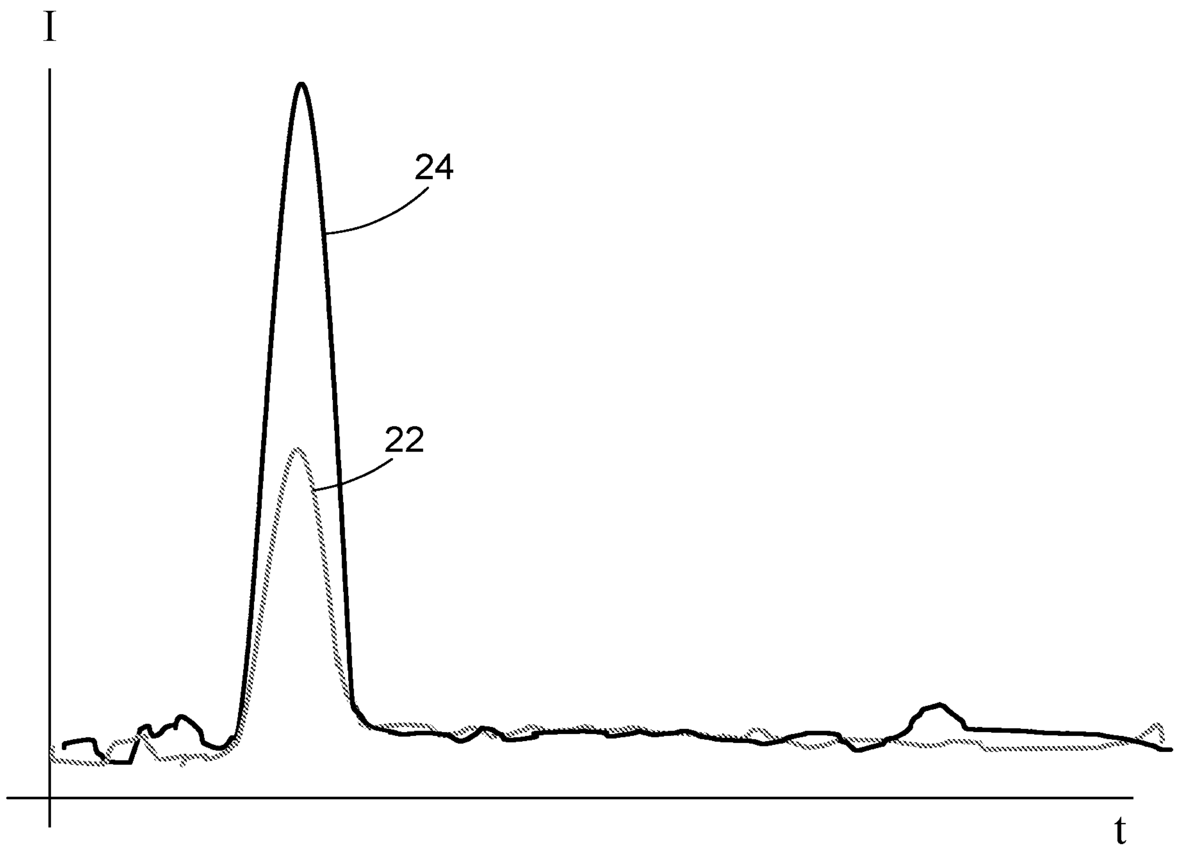
FIG. 3 shows plots illustrating how the ion signal intensity profile as a function of LC elution time may be affected by contamination of the ion optics.

FIG. 3 shows a plot 22 of how the ion signal intensities of a first type of ion vary with elution time of a separator, when the ion signal intensities are determined from the intensities at only the initial parts of the dwell times (e.g. from the first dwell time segment 16 in FIG. 2B). FIG. 3 also shows a plot 24 of how the ion signal intensities of the first type of ion vary with elution time of the separator, when the ion signal intensities are determined from the intensities at only a later part of the dwell times (e.g. from the final dwell time segment 20 in FIG. 2B), or when each ion signal intensity is determined as the average intensity over each dwell time (e.g. line 14 in FIG. 2B). As can be seen from FIG. 3, the two plots 22,24 vary differently in magnitude with time, which indicates that the intensity of the ion signal varies over each dwell time and that the ion optics may be dirty. In contrast, if the ion optics were clean (e.g. as in FIG. 2A), the ion intensity determined at the initial part of a given dwell time would be substantially the same as the ion intensity at a later part of that dwell times (over the short timescale of the dwell time), or the same as the average over the dwell time, and in that case the plots 22,24 would be the same. Accordingly, the spectrometer may determine the cleanliness of the ion optics by comparing the data for plot 22 with that of plot 24.

For a varying source current, such as that from a separator, the area of the peak in plot 22 may be calculated and compared with the area of the peak in plot 24. If the ion optics are clean then the areas under the peaks would be substantially the same, whereas if the ion optics are dirty then the areas of the peaks would differ significantly. The spectrometer is therefore able to determine the cleanliness of the ion optics from the areas of the peaks. Similarly, the locations of the peaks may differ if the optics are dirty, since ions may be received at a later offset time. Similarly, the gradients of the intensity profiles may differ if the ion optics are dirty. The spectrometer may therefore determine the gradients of the different plots 22,24 at the same elution time, compare the gradients and determine the cleanliness of the ion optics from this comparison.

The described embodiments for checking the cleanliness of the ion optics may be performed as a standalone test (e.g. using instrument fluidics, LC solvent peaks, etc.), which could perform an assessment of the cleanliness of the system on demand by a user.

Alternatively, the embodiments for checking the cleanliness of the ion optics may be performed as part of a System Suitability test. System Suitability tests are typically user-defined tests which the user runs before starting an experimental assay to analyse a sample of interest. The test is typically similar to the batch that is about to be run and includes quality controls, sensitivity acceptance criteria, etc. which the spectrometer must pass to be deemed suitable to start the experimental assay. In methods of checking the cleanliness of the ion optics described herein may be set as an acceptance criteria that needs to be met. For example, the ion signal of a quality control may be monitored according to embodiments in order to determine whether the ion optics are clean or dirty, which is advantageous as the approximate ion current of the quality control is known.

Alternatively, embodiments may not perform a separate experiment to determine the cleanliness of the ion optics, but may instead determine the cleanliness of the ion optics from the data obtained during an experimental assay to analyse a sample of interest. In such techniques, two intensity values are obtained during each dwell time, in the manner described herein, during the experimental assay that analyses the sample of interest.

Figure 4:
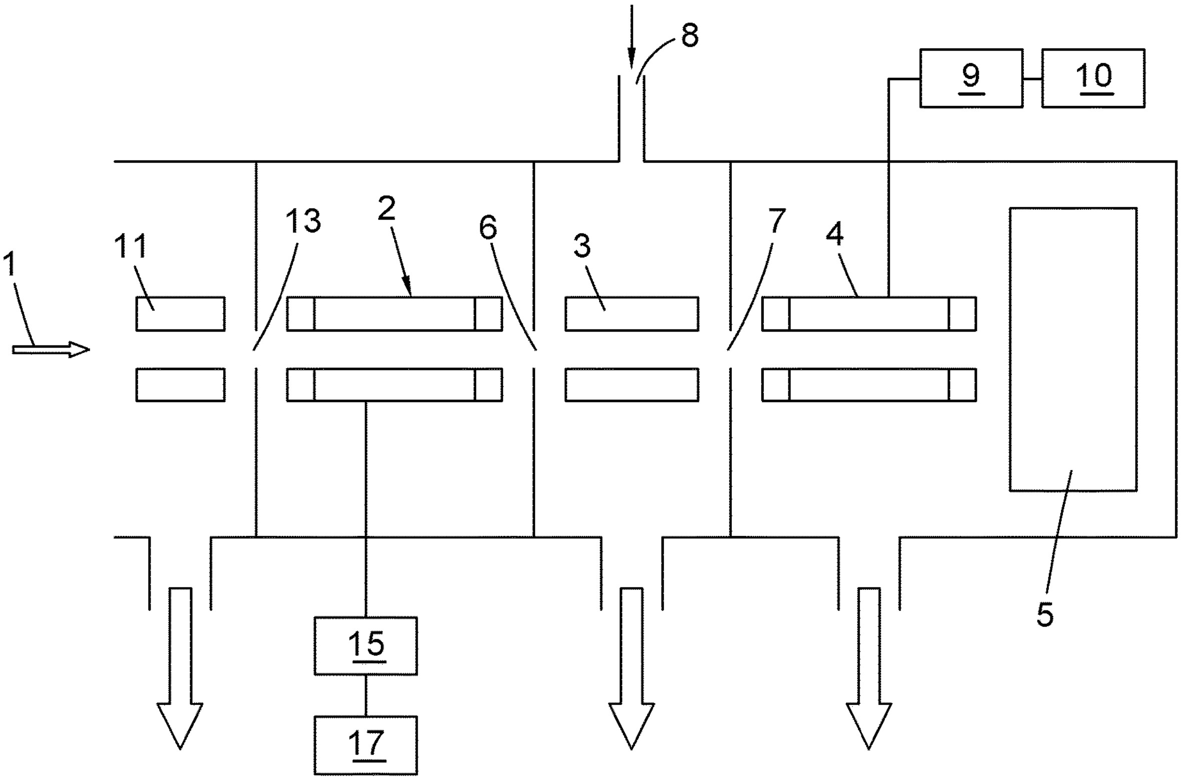
FIG. 4 shows a schematic of a triple quadrupole mass spectrometer according to a second embodiment of the invention.

FIG. 4 shows an embodiment that is the same as that shown in FIG. 1, except that an ion guide 11, such as a quadrupole ion guide, is arranged in a vacuum chamber that is upstream of the vacuum chamber in which the quadrupole mass filter 2 is located. The vacuum chambers in which the ion guide 11 and quadrupole mass filter 2 are located are separated by a wall having a differential pumping aperture 13 therein. The vacuum chamber in which the ion guide 11 is located may be evacuated by one or more vacuum pump, as illustrated by the arrow.

In use, ions 1 from an ion source (not shown) are supplied to the ion guide 11, which has RF voltages applied thereto such that it guides the ions towards and through the differential pumping aperture 13, and into the quadrupole mass filter 2. The spectrometer may then be operated as has been described above in relation to FIG. 1.

In both the embodiments of FIG. 1 and FIG. 4, one or more voltage supply 15 supplies RF and DC voltages to the quadrupole mass filter 2 such that it filters ions according to mass to charge ratio. Control circuitry 17 controls the one or more voltage supply 15 such that the voltages applied, at any given time, to the quadrupole mass filter 2 are such that only ions having a specific mass to charge ratio (or specific range of mass to charge ratios) are able to be guided and onwardly transmitted by the quadrupole mass filter 2 towards the ion detector 5, whereas ions having other mass to charge ratios that are present will be filtered out by the quadrupole mass filter 2. The voltages applied to the quadrupole mass filter 2 may be varied with time by the control circuitry 17, e.g. in a stepped manner, such that the quadrupole mass filter 2 is (only) able to transmit different specific mass to charge ratios (or different specific ranges of mass to charge ratios) towards the ion detector 5 at different times.

The spectrometer may be operated in an MS mode in which substantially only parent ions are analysed. In this mode the components of the spectrometer are controlled such that the parent ions are not significantly fragmented, but are instead transmitted to the ion detector 5. In this mode the voltages applied to the quadrupole rod set 4 may be such that it is operated as an all pass ion guide rather than a mass filter. The voltages applied to the quadrupole mass filter 2 may be held for a period of time (dwell time) so as to transmit only ions having a specific mass to charge ratio. This may be performed by the control circuitry 17 setting the voltages that are applied by the voltage supplies 15. If ions are then detected at the ion detector 5 it is determined that ions of the mass to charge ratio that the mass filter 2 is set to transmit are present. As mentioned above, the quadrupole mass filter 2 may be stepped with time such that the quadrupole mass filter 2 is (only) able transmit ions having different mass to charge ratios at different times. Accordingly, the voltages applied to the quadrupole mass filter 2 may be switched by circuitry 17 so that it is only able to transmit ions having a different mass to charge ratio that corresponds to another parent ion. The voltages are then held for a period of time (dwell time). If ions are detected at the ion detector 5, it is determined that said another parent ion is present. The quadrupole mass filter 2 may be switched in this manner one or more further times in order to determine if one or more further parent ion is present.

As described above in relation to FIG. 1, it is also contemplated that MS/MS analysis may be performed using quadrupole mass filter 2 to select a parent ion, fragmenting the parent ion in quadrupole 3 and analysing the resulting fragment ions using quadrupole mass filter 4. It is contemplated that quadrupole mass filter 2 may switch between transmitting different parent ions at different times so as to perform MS/MS analyses using different parent ions.

The amplitude and/or frequency of the RF voltage applied to the ion guide 11 in order to guide the ions therethrough may be selected based on the mass to charge ratio that the mass filter 2 is set to transmit (at that time), in order to optimise the transportation of ions 1 from the ion guide 11 into the mass filter 2. Accordingly, when the voltages applied to the mass filter 2 are switched, in order to transmit parent ions of different mass to charge ratios, the RF voltage(s) applied to the ion guide 11 are also varied at a corresponding time, i.e. in synchronism. Immediately after these voltage changes to the ion guide 11 and mass filter 2, the ion current leaving the mass filter 2 and being detected may be relatively low, since the voltages are no longer optimised to transmit many of the ions that are within the ion guide 11 at the time of the switch. However, after the voltage change, ions for which the voltages are now optimised will arrive at the ion guide 11 and be efficiently transported along the ion guide 11 and into the mass filter 2. As such, the ion current leaving the mass filter 2 and being detected will increase during the dwell time at which the voltages applied to the mass filter 2 are held. As described above, the transit time of a given ion through the spectrometer will vary depending on the level of contamination of the ion optics, e.g. depending on the level of contamination of the ion guide 11 and/or differential pumping aperture 13. Accordingly, the rate at which the ion signal intensity increases after switching the voltages (and during a dwell time) will vary in dependence on the level of contamination of the ion guide 11 and/or differential pumping aperture 13.

For example, if the ion optics are clean then the ion signal intensity for a substantially constant current source may increase very quickly such that it is relatively constant over the entire dwell time, as shown in FIG. 2A. In contrast, if the ion optics are dirty then the ion signal intensity for a substantially constant current source may increase relatively slowly such that it varies as shown in FIG. 2B. As such, the cleanliness of the ion optics may be determined from the profile of the ion signal, as has been described above in relation to FIGS. 2A-2B.

As described above, embodiments are also contemplated in which the ion current supplied by the source varies with time. For example, the spectrometer may comprise a chromatographic separator (e.g. a liquid or gas chromatography separator) or other separator for separating either the analyte molecules in the sample or separating analyte ions from the sample. According to embodiments having the separator, the quadrupole mass filter 2 may repeatedly perform a cycle of operation whilst the molecules or ions elute from the separator. The cycle may be repeated multiple times over each peak that elutes from the separator. Each cycle of operation comprises holding the voltages applied to the mass filter 2 at values that enable only ions having a first mass to charge ratio to be transmitted towards the detector 5 for a first dwell time, and then switching and holding the voltages applied to the mass filter 2 at different values that enable ions having only a second, different mass to charge ratio to be transmitted towards the detector 5 for a second dwell time. Although the quadrupole mass filter 2 has been described as being switched twice in each cycle, it may be switched in this manner one or more further times during each cycle. Alternatively, the spectrometer may be switched so that each cycle only comprises transmitting the first ion and transmitting no ions.

The data recorded by the spectrometer may be processed to determine how the ion signal intensities for one of the types of ions (e.g. the first or second ion) varies as a function of the elution time from the separator. This may be performed by determining the ion signal intensities from the cycles that correspond to said one of the types of ions and determining how these vary as a function of the elution time from the separator. The ion signal intensities for said one of the types of ions are determined from the ion signals detected during the dwell times at which the mass filter was operated so as to transmit said one of the types of ions.

The spectrometer may determine how the ion signal intensities for one of the types of ions (e.g. the first or second ion) varies as a function of the elution time from the separator, when the ion signal intensities are determined from the intensity at only the initial parts of the dwell times. The spectrometer may also determine how the ion signal intensities for the one of the types of ions varies as a function of the elution time from the separator, when the ion signal intensities are determined from the intensities at only a later part of the dwell times (or when each ion signal intensity is determined as the average intensity over each dwell time). This data can then be used to determine if the ion optics are clean or dirty, in the same manner as has been described in relation to FIG. 3.

Figure 5:
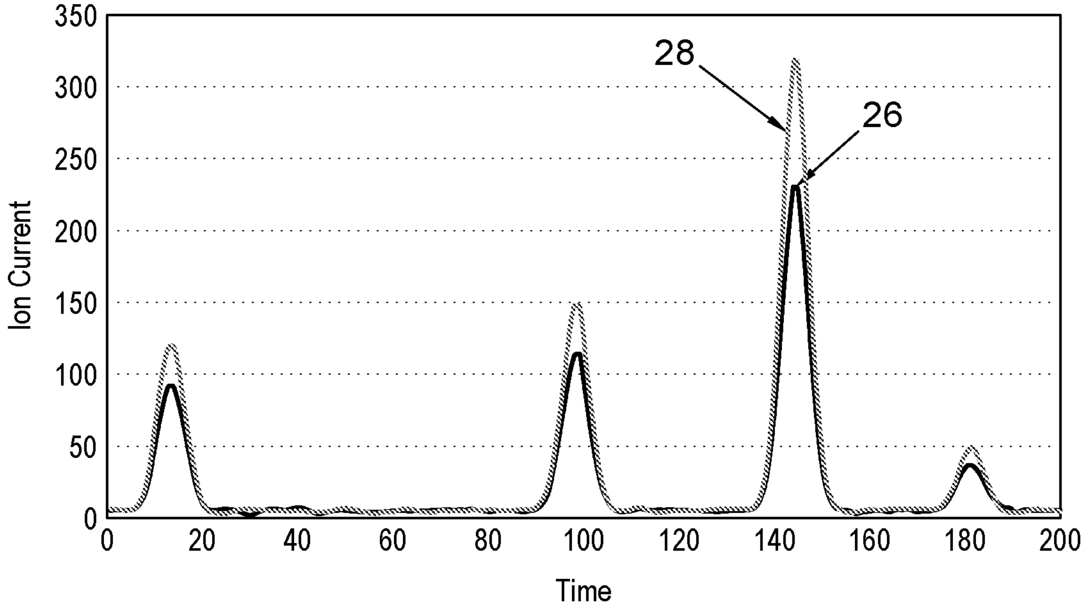
FIG. 5 shows further plots illustrating how the ion signal intensity profile as a function of LC elution time may be affected by contamination of the ion optics.

FIG. 5 shows a plot that is similar to that of FIG. 3, except with multiple peaks at different times. Plot 26 shows how the ion signal intensities vary with elution time of a separator when the ion signal intensities are determined from the intensities at only the initial parts of the dwell times. FIG. 5 also shows a plot 28 of how the ion signal intensities vary with elution time of the separator when the ion signal intensities are determined from the intensities at only the later part of the dwell times (or when each ion signal intensity is determined as the average intensity over each dwell time).

As can be seen from FIG. 5, the two plots 26,28 vary differently in magnitude for each of the peaks, which indicates that the intensity of the ion signal varies over each dwell time for each peak and that the instrument may therefore be suffering from undesirable electrical charges building up on the ion optics. In contrast, if such charging was not present, the ion intensity determined at the initial part of a given dwell time would be substantially the same as the ion intensity at a later part of that dwell time, and in that case the plots 26,28 would be substantially the same. Accordingly, the spectrometer may determine if there is a problem, such as undesirable charging of the ion optics, by comparing the data for plot 26 with that of plot 28 and, for example, determining that the plots 26 and 28 differ in intensity for multiple peaks. Alternatively, the problematic charging of the ion-optics may only occur when a relatively large intensity ion flux is present, e.g. as illustrated by FIG. 6.

Figure 6:
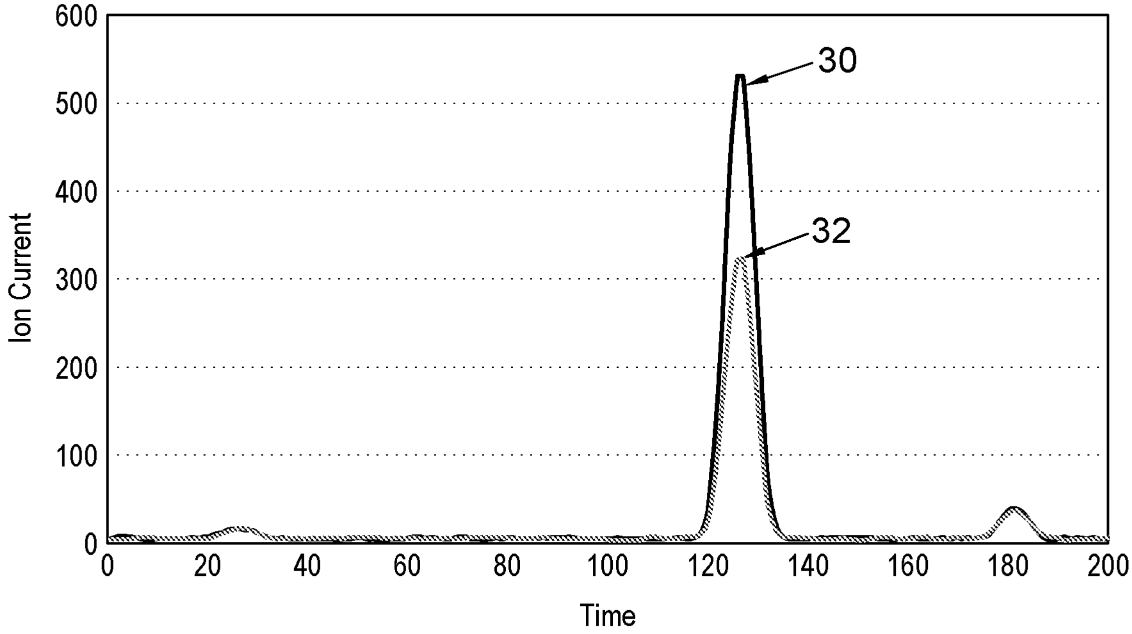
FIG. 6 shows further plots illustrating how the ion signal intensity profile as a function of LC elution time may be affected by an intense ion species.

FIG. 6 shows a plot 30 of how the ion signal intensities vary with elution time of a separator when the ion signal intensities are determined from the intensities at only the initial parts of the dwell times. FIG. 6 also shows a plot 32 of how the ion signal intensities vary with elution time of the separator when the ion signal intensities are determined from the intensities at only the later part of the dwell times (or when each ion signal intensity is determined as the average intensity over each dwell time). As can be seen from FIG. 6, the two plots 30,32 vary differently in magnitude for only the central, relatively intense peak, whereas the they are substantially the same for the other, relatively low intensity peaks.

When it is determined that the intensities of only some of the peaks vary differently in magnitude, these peaks may be labelled or marked as inaccurate to prevent the analysis or further use of the data.

Although the present invention has been described with reference to preferred embodiments, it will be understood by those skilled in the art that various changes in form and detail may be made without departing from the scope of the invention as set forth in the accompanying claims.

For example, although a triple quadrupole mass spectrometer has been described for performing MRM experiments, the invention is not limited to such spectrometer and may be performed on any instrument having a mass filter. Similarly, the mass filter is not restricted to a quadrupole mass filter.

Although embodiments have been described in which the cleanliness of the ion guide is determined from how the ion signal varies during the dwell time that a mass filter is held at a certain mass transmission window before being switched to another mass transmission window, it is contemplated that alternatively the mass transmission window of the filter may remain constant and the ions may only be allowed to pass to the mass filter over a time period that defines the "dwell time" during which the spectrometer is able to transmit ions to the detector. For example, the RF voltage on an upstream ion guide for radially confining ions may be switched off so as to prevent ions reaching the mass filter and may then be switched on so as to allow ions to pass to the mass filter. Alternatively, an ion gate may be provided to prevent ions reaching the mass filter and may then be switched so as to allow ions to pass to the mass filter. The ion gate may provide a DC or pseudo-potential barrier that is switched on and off.

As described herein, the spectrometer may automatically determine that the ion-optics are contaminated from the intensities detected. The spectrometer may then control a user interface to indicate this to a user, such as by controlling a visual display unit or an alarm. Alternatively, or additionally, when the spectrometer determines that the ion-optics are contaminated, it may apply one or more compensation voltages to the ion optics in order to compensate for the effect of the contamination on the ions passing the ion optics.

It is contemplated that when the spectrometer determines that the ion-optics are contaminated, it may automatically control a heater so as to heat the ions optics (e.g. the ion-optics that are most prone to contamination) so as to burn off the contamination.

Embodiments have been described in which the intensity of a species of ion is determined twice in each dwell time in order to determine if the ion-optics are contaminated (or alternatively to determine, more generally, that there is a cause of variation in sensitivity for the species, since it may be caused by a problem other than contamination of the ion-optics). However, it is contemplated that the intensity of the species of ion may instead be determined only once in each dwell time, but in multiple dwell times.

For example, the quadrupole mass filter 2 may repeatedly perform a cycle of operation during the experimental run. Each cycle of operation may comprise holding the voltages applied to the mass filter 2 at values that enable only ions having a first mass to charge ratio (species A) to be transmitted towards the detector 5 for a first dwell time, subsequently switching and holding the voltages applied to the mass filter 2 at different values that enable ions having only a second, different mass to charge ratio (species B) to be transmitted towards the detector 5 for a second dwell time, and subsequently switching and holding the voltages applied to the mass filter 2 at values that enable only ions having the first mass to charge ratio (species A) to be transmitted towards the detector 5 for a third dwell time. This cycle is repeated during the experimental run.

Although the quadrupole mass filter 2 has been described as being switched so as to transmit species A twice in each cycle and to transmit species B only one in each cycle (i.e. in the sequence ABA), it is contemplated that species B may also be transmitted twice in each cycle. For example, each cycle may transmit the species in the following sequence ABAB or ABBA. Additionally, or alternatively, one or more further species may be transmitted during each cycle. For example, six species A-F may be sequentially transmitted in each cycle, e.g. in the following sequence ABBACDDC-EFFE.

Embodiments are contemplated in which the spectrometer comprises a chromatographic separator (e.g. a liquid or gas chromatography separator) or other separator for separating either the analyte molecules in the sample or separating analyte ions from the sample. The above-described cycle may then be repeated multiple times over each peak that elutes from the separator.

The data recorded by the spectrometer may be processed to determine how the ion signal intensities for one of the types of ions (e.g. any one of species A-F) varies as a function of time during the experimental run, e.g. as a function of the elution time from the separator. This may be performed by determining the ion signal intensities from the cycles that correspond to said one of the types of ions and determining how these vary as a function of time during the experimental run. The ion signal intensities for said one of the types of ions are determined from the ion signals detected during the dwell times at which the mass filter was operated so as to transmit said one of the types of ions.

The spectrometer may determine how the ion signal intensities for one of the types of ions varies as a function of time, using only the ion signal intensities determined for that ion during an initial part of the cycle. For example, if each cycle comprises the sequence $A_1B_1B_2A_2$ (where the subscript integer indicates the number of times that the species has been transmitted in the cycle), then the spectrometer may determine how the ion signal intensity for species A varies as a function of time using only the intensity values for $A_1$ from the multiple cycles (and not $A_2$). The spectrometer may also determine how the ion signal intensities for the one of the types of ions varies as a function of time, using only the ion signal intensities determined for that ion during a later part of the cycle. For instance, in the example where each cycle comprises the sequence $A_1B_1B_2A_2$, then the spectrometer may determine how the ion signal intensity for species A varies as a function of time using only the intensity values for $A_2$ from the multiple cycles (and not $A_1$). This data can then be used to determine if the ion optics are clean or dirty (or if there is another problem causing a variation in sensitivity for that species), in the same manner as has been described in relation to FIG. 3.

The invention claimed is:

1. A mass spectrometer comprising:

an ion detector;

ion optics for guiding ions to the ion detector;

one or more voltage supply for supplying voltages to said ion optics;

control circuitry for controlling the one or more voltage supply so as to switch the ion optics between operating in a first mode in which the ion optics are unable to transmit ions having a first mass to charge ratio or first polarity to the ion detector and a second mode in which the ion optics are able to transmit ions having said first mass to charge ratio or first polarity to the ion detector for a time period; and to repeatedly switch between the first and second modes a plurality of times; and a processor and circuitry configured to:

(i) determine the intensity of an ion signal detected by the detector at a first time in each of the time periods that the ion optics are in the second mode, and determine that these intensities vary as a function of time;

(ii) determine the intensity of the ion signal detected by the detector at a second, later time in each of the time periods that the ion optics are in the second mode, and determine that these intensities vary as a function of time; and (iii) determine that the intensities obtained in step (i) vary with time in a different manner to the intensities obtained in step (ii) and, in response, produce a first output.

2. The spectrometer of claim 1, wherein the processor and circuitry are configured such that: step (i) comprises determining that the ion signal varies with time as a peak; step (ii) comprises determining that the ion signal varies with time as a peak; step (iii) comprisesdetermining that the area of the peak determined in step (i) is different from the area of the peak determined in step (ii); and step (iv) comprises producing said first output.

3. The spectrometer of claim 2, wherein step (iii) determines that the area of the peakdetermined in step (i) is lower than the area of the peak determined in step (ii); or wherein step (iii) determines that the area of the peak determined in step (ii) is lower than the area of the peak determined in step (i).

4. The spectrometer of claim 1, wherein the processor and circuitry are configured such that: step (i) comprises determining a gradient of the ion signal at a first time in the intensity profile; step (ii) comprises determining a gradient of the ion signal at a time in the intensity profile corresponding to said first time; step (iii) comprises determining that the gradient determined in step (i) is lower than the gradient determined in step (ii); and step (iv) comprises producing said first output.

5. The spectrometer of claim 1, wherein processor and circuity areconfigured to:

determine how the intensities obtained in step (i) vary as a function of time;

determine how the intensities obtained in step (ii) vary as a function of time;

determine if the intensities obtained in step (i) vary with time in the same manner as the intensities obtained in step (ii); and in response to determining that the intensities vary with time in the same manner, produce a second output.

6. The spectrometer of claim 1, comprising a separator for separatinganalyte molecules or ions upstream of the ion optics.

7. The spectrometer of claim 1, wherein the control circuitry is configuredto control the one or more voltage supply to repeatedly switch the ion optics between operating in the first and second modes a plurality of times during a single experimentalrun.

8. A method of mass spectrometry comprising:

providing a mass spectrometer as claimed in claim 1; and determining the cleanliness of the ion optics, or other condition in the spectrometer, by:

repeatedly switching the ion optics between the first mode and the second mode a plurality of times;

(i) determining the intensity of an ion signal detected by the detector at a first time in each of the time periods that the ion optics are in the second mode, and determining that these intensities vary as a function of time;

(ii) determining the intensity of the ion signal detected by the detector at a second, later time in each of the time periods that the ion optics are in the second mode, and determining that these intensities vary as a function of time; and (iii) determining that the intensities obtained in step (i) vary with time in a different manner to the intensities obtained in step (ii) and, in response, producing a first output.

9. A mass spectrometer comprising: an ion detector;

ion optics for guiding ions to the ion detector;

and a processor and circuitry configured to:

(i) control the ion optics so as to sequentially perform a plurality of cycles of operation during a single experimental run, wherein each cycle of operation comprises transmitting a first species of ion for a first dwell time, subsequently transmitting a second different species of ion for a second dwell time, and subsequently transmitting the first species of ion for a third dwell time;

(ii) determine the intensity of an ion signal detected by the detector during the first dwell time in each of the plurality of the cycles, and determine that these intensities vary as a function of time;

(iii) determine the intensity of an ion signal detected by the detector during the third dwell time in each of the plurality of the cycles, and determine that these intensities vary as a function of time; and (iv) determine that the intensities obtained in step (i) vary with time in a different manner to the intensities obtained in step (ii) and, in response, produce a first output.

10. The spectrometer of claim 9, wherein each cycle of operation further comprises transmitting the second species of ion for a fourth dwell time, wherein the fourth dwell time is between the second and third dwell times or after the third dwell time.

11. The spectrometer of claim 9, wherein each cycle of operation comprises transmitting a third or further species of ion during at least one further dwell time.

12. The spectrometer of claim 9, comprising a separator for separating either analyte molecules in an analytical sample or separating analyte ions from an analytical sample, wherein the processor and circuitry are configured to control the ion optics so as to sequentially perform said plurality of cycles of operation during a peak that elutes from the separator.

13. A method of mass spectrometry comprising:

providing a mass spectrometer as claimed in claim 9; and determining the cleanliness of the ion optics, or other condition in the spectrometer, by:

(i) performing a plurality of cycles of operation during a single experimental run, wherein each cycle of operation comprises transmitting a first species of ion for a first dwell time, subsequently transmitting a second different species of ion for a second dwell time, and subsequently transmitting the first species of ion for a third dwell time;

(ii) determining the intensity of an ion signal detected by the detector during the first dwell time in each of the plurality of the cycles, and determining that these intensities vary as a function of time;

(iii) determining the intensity of an ion signal detected by the detector during the third dwell time in each of the plurality of the cycles, and determining that these intensities vary as a function of time; and (iv) determining that the intensities obtained in step (i) vary with time in a different manner to the intensities obtained in step (ii) and, in response, producing a first output.

* * * * *